United States Patent [19]

Cruickshank

[11] Patent Number: 4,613,234
[45] Date of Patent: Sep. 23, 1986

[54] PROFILE IMAGING TECHNIQUES

[75] Inventor: John S. Cruickshank, Inchture, Scotland

[73] Assignee: LBP Partnership, St. Louis, Mo.

[21] Appl. No.: 568,381

[22] Filed: Jan. 5, 1984

[30] Foreign Application Priority Data

Jan. 10, 1983 [GB] United Kingdom ................ 8300512

[51] Int. Cl.$^4$ ............................................. G01B 11/00
[52] U.S. Cl. .................................... 356/394; 356/398; 358/106
[58] Field of Search ............... 356/376, 391, 392, 393, 356/394, 398; 358/101, 106, 107

[56] References Cited

U.S. PATENT DOCUMENTS

| 1,546,636 | 7/1925 | Engelmann . | |
|---|---|---|---|
| 1,594,607 | 8/1926 | Engelmann . | |
| 2,066,996 | 1/1937 | Morioka . | |
| 2,163,124 | 6/1939 | Jeffreys et al. . | |
| 2,163,125 | 6/1939 | Jeffreys et al. . | |
| 2,335,127 | 11/1943 | Ling . | |
| 3,085,923 | 4/1963 | Agnew . | |
| 3,246,570 | 4/1966 | Nogradi et al. . | |
| 3,546,377 | 12/1970 | Troll ..................... | 356/376 |
| 3,624,371 | 11/1971 | Neal et al. . | |
| 3,688,676 | 9/1972 | Cruickshank . | |
| 3,690,242 | 9/1972 | Cruickshank . | |
| 3,796,129 | 3/1974 | Cruickshank . | |
| 3,866,052 | 2/1975 | Di Matteo et al. ................. | 250/558 |
| 3,884,577 | 5/1975 | Carpentier et al. . | |
| 3,932,923 | 1/1976 | Di Matteo . | |
| 3,969,577 | 7/1976 | Lloyd et al. ........................ | 358/106 |
| 3,976,382 | 8/1976 | Westby ........................... | 356/398 X |
| 4,302,097 | 11/1981 | Chlestil . | |
| 4,458,993 | 7/1984 | Kempf ............................ | 356/393 X |
| 4,472,056 | 9/1984 | Nakagawa et al. ................. | 356/376 |
| 4,491,868 | 1/1985 | Berridge, Jr. et al. ......... | 358/106 X |
| 4,509,075 | 4/1985 | Simms et al. ....................... | 358/106 |

FOREIGN PATENT DOCUMENTS 939261 10/1963 United Kingdom .
939262 10/1963 United Kingdom .

Primary Examiner—F. L. Evans
Attorney, Agent, or Firm—Haverstock, Garrett & Roberts

[57] ABSTRACT

A method and apparatus of measurement and/or dimensional comparison. The method utilizes the steps of locating an object on a prescribed first plane with reference to a datum position, illuminating the object with a thin fan-shaped beam of light in a second plane substantially perpendicular to the prescribed first plane along a sufficiently narrow strip to produce a thin light trace, scanning the object in a third plane angularly displaced from said second plane by means of a video camera adjusted, focussed and positioned so as to discriminate the illuminated strip from the background and the remainder of the object, comparing the amplitude of the video signal at a series of positions along the scan with a corresponding series of values representing the desired amplitudes at those positions along the scan in order to derive error indications, linearly displacing the object a prescribed distance in the first plane in a direction which includes a component normal to the line produced by the intersection of said second and third planes, repeating the second and fourth steps, and repeating the fifth step until the entire volume of interest has been scanned at a plurality of intervals. An apparatus to accomplish the method is also provided.

18 Claims, 5 Drawing Figures

PROFILE IMAGING TECHNIQUES

This invention relates to the dimensional checking of an article during its manufacture so as to test its progress or its final compliance with the specified dimensions of the finished product.

The need to check the size of a machined article either during its manufacture or on completion, or both, usually adds appreciably to the unit manufacturing costs and involves the use of skilled personnel and this is more the case where the article has a complex outline. If the article is irregular in all three dimensions, such cost can be a considerable proportion of the manufacturing costs. The purpose of the present invention is to teach the use of a method and apparatus to enable such checking to be carried out at each stage of manufacture or with the final product without the need of particularly trained or skilled personnel and without any direct measurement by means of contact with the manufactured object itself.

According to the invention there is provided a method of measurement and/or dimensional comparison comprising the steps of:

(1) locating an object on a prescribed first plane with reference to a datum position, (2) illuminating the object in a second plane substantially perpendicular to said prescribed first plane along a narrow strip;

(3) scanning the object in a third plane angularly displaced from said second plane by means of a video camera adjusted, focussed and positioned so as to discriminate the illuminated strip from the background and the remainder of the object;

(4) comparing the amplitude of the video signal at a series of positions along the scan with a corresponding series of values representing the desired amplitudes at those positions along the scan in order to derive error indications;

(5) linearly displacing the object a prescribed distance in said first plane in a direction which includes a component normal to the second and third planes and repeating steps (2) to (4);

(6) repeating step 5 until the entire volume of interest has been scanned.

In the preferred method a previous recording of an accurately prepared and scaled representation, similarly set up, is pre-recorded using a video recorder. Each pre-recorded scan is then reproduced on one trace of a split screen or split beam VDU alongside and in registration with the corresponding scan of the article being manufactured. Comparisons are then made at various positions along the scans, so as to detect variations. The invention also provides apparatus for performing the preferred method.

Hereinafter the invention is described by eay of example with reference to the accompanying drawings, where:

Figure 1:
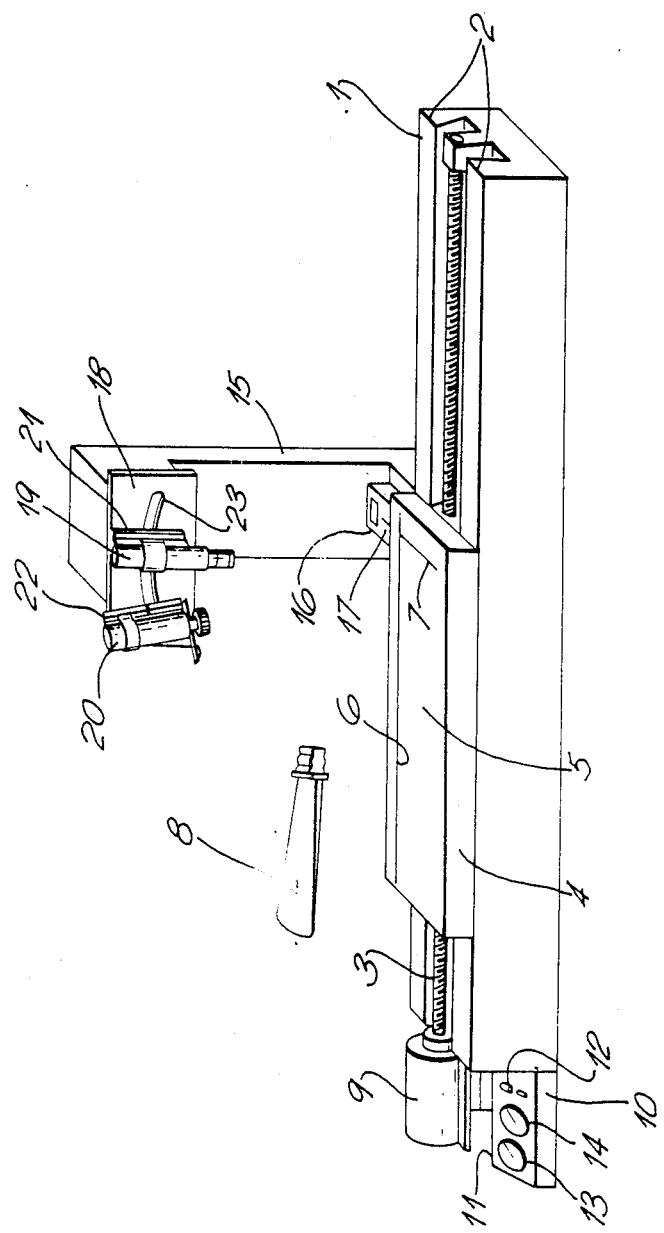
FIG. 1 illustrates a profiling table for deriving a linear sequence of profile scans of the article being tested.

Referring now to FIG. 1, there is shown a bench 1 having longitudinal slideways 2 and a rotatable lead screw 3. Slidably mounted on the slideways of the bench is a machine table 4 having an upper horizontal mounting surface 5 on which there is marked or engraved a pair of mutually perpendicular datum lines 6, 7, of which one datum line 6 is arranged parallel to the aforesaid slideways and is positioned near a longitudinal edge of the machine table and the other, transverse, line 7 is positioned near to one end of the machine table. The article 8 to be tested is mounted on the machine table aligned with reference to the datum lines. A lead screw nut or recirculating ball mechanism held captive on the underside of the machine table engages the lead screw in the normal way (neither being shown).

A motor 9 mounted on the bench is coupled to the lead screw (at one end thereof) to provide a rotating drive and is preferably of the discrete incremental movement type (also known as a pulse-activated motor). It is possible to use a standard electrical motor instead but an angular displacement encoder coupled to the motor or lead screw is also then necessary so that the precise position of the machine table at each scan can be determined. The use of an encoder in this manner, including the use of digital encoders and digital display units for providing a visual representation of the angular displacement of the lead screw and therefore of the position of the machine table 4 along the slideways, is well known and is not illustrated or described in further detail herein. As shown pulse motor 9 is energised from control unit 10 also mounted on the bench. The latter includes a control panel 11 on which manual controls are mounted. These controls include a power-on switch 12, forward, off and reverse drive switch 13, and a switch 14 for adjusting a time interval between pulses, each pulse providing a prescribed increment of movement of the machine table. This latter switch may include a fast pulsing position to allow for fast movement of the machine table.

A vertical column 15 supported on the bench 1 is provided alongside the slideways 2 in an intermediate position between the two ends of the bench. A digital counter 16 mounted on the bench 1 in front of the column 15 and mechanically coupled to the machine table 4 or, alternatively, coupled through a drive mechanism (not shown) to the lead screw 3, provides a digital indication of the position of the machine table along the bench, said counter being positioned so as to permit the machine table to be displaced with respect thereto through its entire length in both longitudinal directions. The counter 16 includes a zero mechanism to enable the reading to be zeroed at the onset of the measurement. In an alternative arrangement the counter may be a purely electrical device capable of being reset and being responsive to the pulses used to drive the pulse-activated motor 9. Counter 16 is provided with a physical index 17 which registers with the table 4, and in particular, the transverse datum line when the table is set to a starting position.

A mounting plate 18 is secured at the top of the column 15 so that it is positioned above the table 4 and in a plane parallel to the vertical plane containing the axis of the lead screw 3. This plate supports in spaced-apart locations at least one light beam generating means 19 and at least one CCD-type electronic video camera 20. Light beam generating means 19 and camera 20 are each mounted on base members 21 and 22, which permits adjustment of the said light beam generating means or camera in a direction along their respective longitudinal axes. An arcuate slot 23 in plate 11 is provided for mounting the base members 21 and 22 therein so as to facilitate the positioning of the light beam generating means and the camera in directions parallel to the slideways and also so as to facilitate adjustment of their orientation relative to vertical axes. In a typical arrangement light beam generating means will be arranged above the index 17 and oriented so as to project a beam of light in the vertical plane containing this index, and the camera will be disposed and angled in a prescribed manner so that is longitudinal axis is in a plane which intersects the said vertical plane through an axis containing the index 17 and forms an angle with said vertical plane of approximately 20°. The field of view of the camera also includes the counter 16, the camera being disposed so that the counter display occupies a prescribed position in said field of view.

Figure 2:
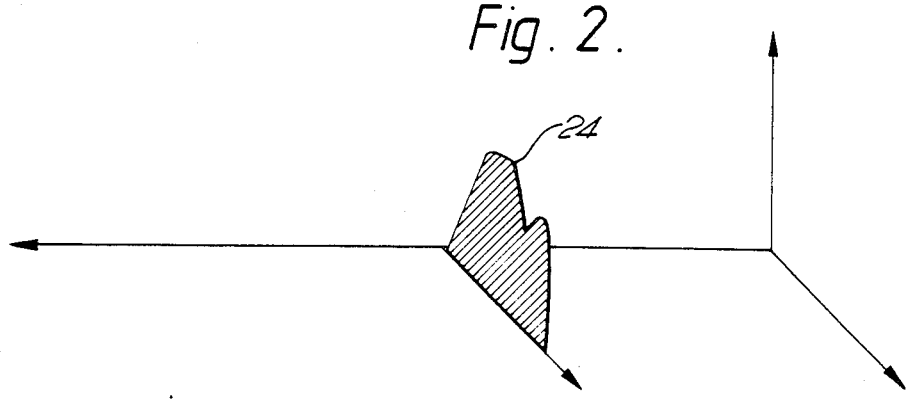
FIG. 2 shows diagrammatically a representative profile of the article under test somewhere along its length.

Preferably the light beam generating means comprises a laser which generates a very thin fan-shaped beam of light and of an angular width sufficient to extend across the width of the table 4 and any object thereon. A typical profile of an article 8 as seen by the camera is defined in FIG. 2 by line 24 which represents the line across the article which is illuminated by the flat beam of light. FIG. 2 shows a profile of the article somewhere along its length.

Figure 3:
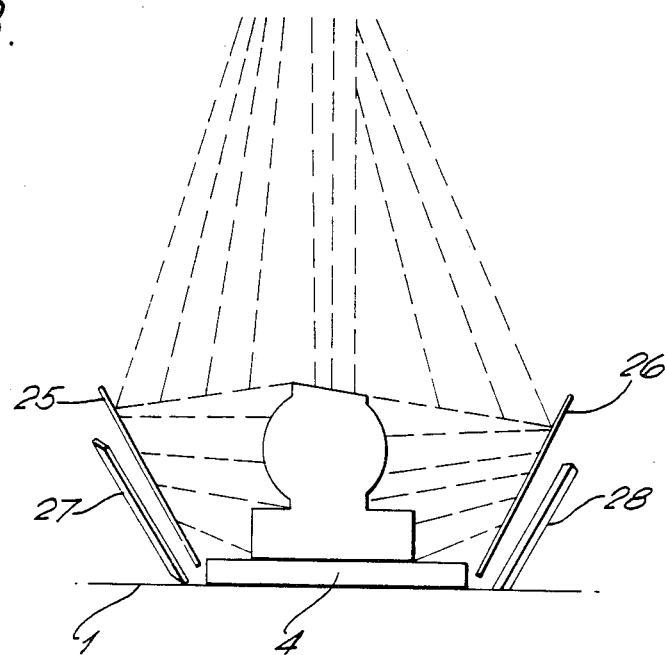
FIG. 3 illustrates the treatment of articles having deep recesses.

Referring to FIG. 3, which illustrates the treatment of a complex shape, reflectors 25, 26, may be included in the light beam path, being mounted on the bench so as to provide illumination by the light beam of any areas (called herein re-entrant areas) of the article which are screened from the laser source by overhanging parts. Additional mirrors 27, 28, similarly mounted, reflect light from the article, resulting from the illumination thereof by the beam, into the field of view of the camera whereby the scanned profile is visually extended at both its ends by the additional light from the sides of the article. Such an arrangement has the purpose of ensuring that the entire profile of the object is effectively scanned, notwithstanding the re-entrant areas.

Figure 4:
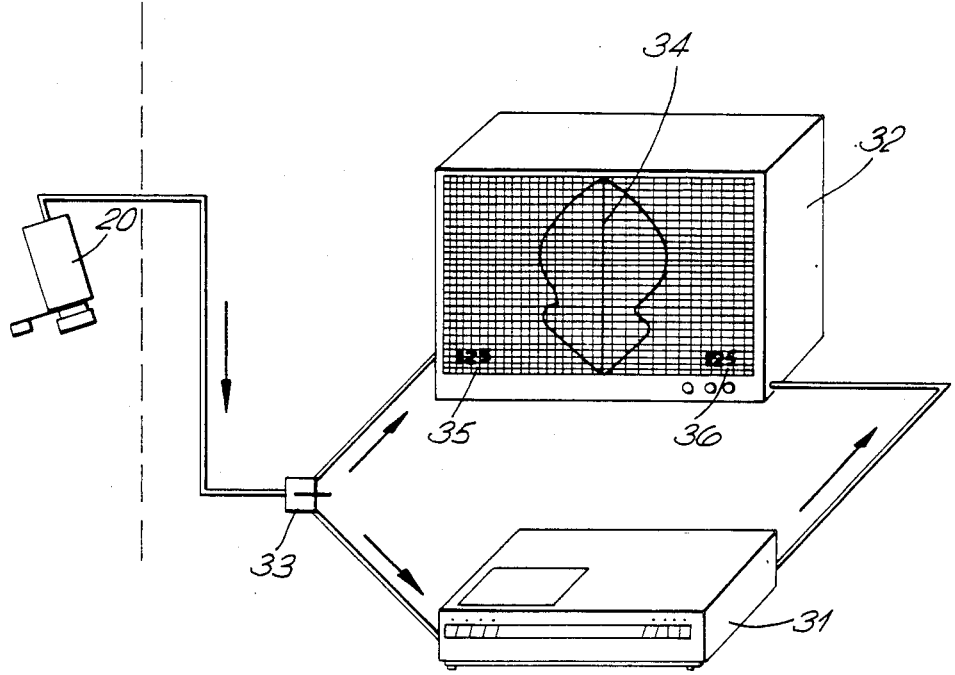
FIG. 4 shows the arrangement for pre-recording the profile scans and for displaying simultaneously the pre-recorded profile scans with new profile scans.

Referring now to FIG. 4, there is shown a video recorder 31, a visual display unit (VDU) 32 and a camera switch 33. The camera switch 33 switches an input received from the CCD camera 20 either to the input of the recorder 31 or to the input of the VDU 32. The VDU 32 has two inputs and a display split along the vertical axis 34 into two halves, being either of the split screen or split beam type; that is in effect there is a trace on the screen from each input. Preferably the base lines of the two half screens are coincident. One input of the VDU is connected to one output of the camera switch 33 and, as seen, provides the left-hand trace. An output from the recorder 31 is connected to the second input of the VDU and, as seen, this output is displayed on the right-hand side of the screen. Also shown on the screen of the VDU are two numerical displays 35, 36, shown respectively in the bottom left and the bottom right corners. These numbers represent the display of the counter 16 which is in the field of view of the camera. The number 36, displayed on the right-hand side of the screen, is therefore a number which was pre-recorded with the pre-recorded profile scan.

Operation is as follows. Switch 33 is set so that the output of the camera 20 is fed to the left-hand input of the VDU. The object to be tested is placed on the machine table 4 and aligned in a prescribed manner with reference to the two datum lines 6, 7 thereon. The machine table is then positioned so that the transverse datum line 7 is aligned with the index 17. The counter is zeroed. The lamp is turned on and oriented relative to the said datum lines so that the object is illuminated across the entire exposed surface of its periphery by the aforesaid flat beam of light; that is a very fine, thin light trace appears across the object. The beam of light is disposed in a vertical plane which includes the index 17 and the datum line 7. The camera is oriented in the prescribed manner so as to scan the full width of this line of light and is appropriately focussed. The adjustment is such that the base line of the trace of the left-hand half of the scan is arranged coincident with the vertical axis 34 and the number 35 is positioned precisely in a predetermined location. The recorder, having a pre-recording of the desired profiles, is set to freeze frame operation and "inched" forward so as to display the first corresponding scan (as identified by the number appearing on the bottom right-hand corner of the screen). The profiles on the two halves of the screen are compared and, if desired, measured. The machine table 4 is then moved along to the next incremental position and the video recorder is inched on to display the recording of the next profile. The two traces on the screen are again compared. This process continues until the entire article has been scanned and compared with corresponding profiles which have been pre-recorded.

The preparation of the video recording requires exactly the same initial procedure, care being taken in setting up the light beam source, the camera and the article to the prescribed criteria. The article in this case is an exactly prepared article fully meeting dimensional requirements, or a representation thereof. Having set up the article, the switch 33 is set so that the camera inputs to the recorder 31. A brief recording is made of the scan of the camera and the video recorder is then stopped. The machine table is moved to its next position, the video recorder is "inched forward" so as to be clear of the last recording and a recording of the next profile is made. This process is repeated until a set of profiles is recorded of the entire representation. In between recordings the output of the camera can be monitored using the left-hand half of the screen merely by resetting the switch 33. The result of recording a profile can be checked using the right-hand side of the screen.

Figure 5:
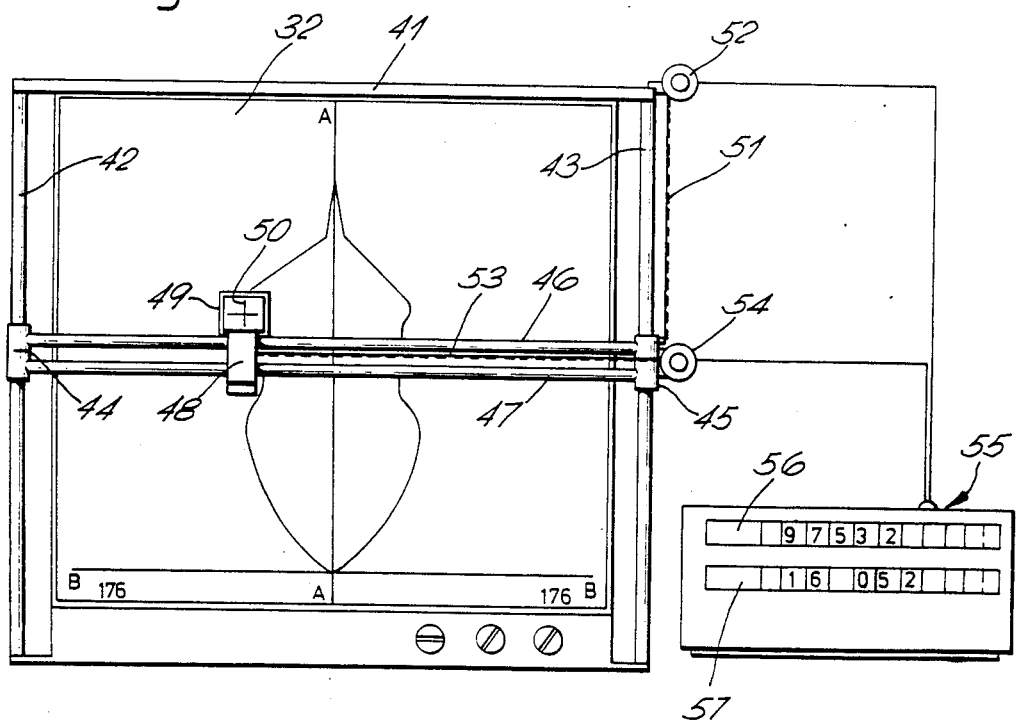
FIG. 5 illustrates means for taking measurements directly from a VDU.

Referring now to FIG. 5, an open rectangular structure 41 is superimposed in front of the VDU 32 so as to frame both halves of the screen. The two vertical members 42, 43 of this structure constitute slide rails on which there are mounted sliding members 44, 45. The latter are rigidly joined together by horizontal rails 46, 47. A slider 48 is slidably mounted on rails 46, 47. An optical magnifying viewer 49 having a pair of cross wires 50 is rigidly mounted on slider 48. A first biased wire 51 is coupled at one end to sliding member 45 and is reeled at the other end into electro-mechanical transducer 52 supported on the structure 41. Transducer 52 generates pulses in relation to the reeling and unreeling of the wire 51. A second biased wire 53 is coupled at one end to the slider 48 and is reeled at the other end into a second electro-mechanical transducer 54 mounted on sliding member 45. Transducers 52 and 54 are identical. The output of each transducer is connected to a respective input of a two-axes digital display unit 55. Digital display unit 55 converts the input pulses from the transducers into signals representing the positive and negative displacements of the cross wires 50 in the X and the Y axes, and displays each respective set of signals at the respective display window 56 or 57. The cross wires 50 may be moved over the entire display surface of the screen and by this means precise measurements or precise comparisons of the amplitudes of profile of the article being manufactured may be made with the corresponding amplitudes of the corresponding profile of the master, without any physical measurements being taken on the article itself. Of course the displays provided by the display unit may be scaled so as to correspond directly, in any required units, to the exact measurements of the article. This scaling process may include angular compensation to allow for the fact that the camera cannot be placed orthogonally with respect to the scanned profile if it is to have a clear field of view of all but re-entrant areas. Microprocessors having the function of making these angular compensations are commercially available and they need no specific description herein. A microprocessor performing this function would be connected with the circuits of the two axes display unit 55.

I claim:

1. A method of measurement and/or dimensional comparison comprising the steps of:

(1) locating an object on a prescribed first plane with reference to a datum position, (2) illuminating the object with a thin fan-shaped beam of light in a second plane substantially perpendicular to said prescribed first plane along a sufficiently narrow strip to produce a thin light trace;

(3) scanning the object in a third plane angularly displaced from said second plane by means of a video camera adjusted, focussed and positioned so as to discriminate the illuminated strip from the background and the remainder of the object;

(4) comparing the amplitude of the video signal at a series of positions along the scan with a corresponding series of values representing the desired amplitudes at those positions along the scan in order to derive error indications;

(5) linearly displacing the object a prescribed distance in said first plane in a direction which includes a component normal to the line produced by the intersection of said second and third planes and repeating steps (2) to (4);

(6) repeating step 5 until the entire volume of interest has been scanned at a plurality of intervals wherein parts of the beam of light which are not naturally incident upon the object are reflected onto one or both sides thereof so as to illuminate re-entrant areas along said narrow strip.

2. A method according to claim 1 wherein the field of view of the camera includes reflectors on one or both sides of the object which are positioned to deflect light from the said narrow strip on one or both sides of the object with the said camera field of view, thereby effectively extending the camera scan of the object.

3. Apparatus comprising a profiling table by means of which an object being checked is advanced along a prescribed horizontal axis in precise predetermined steps, a light beam generating means for casting a substantially vertical fan-shaped, very thin beam across the object, said beam being substantially normal to the said axis, a camera arranged to scan the strip of the object illuminated by said beam and generate a video signal representing said scan, said camera being angularly displaced from the beam with respect to the illuminated strip, a visual display unit (VDU) for displaying by means of a first trace the video signal generated by the camera and fed to a first input of the VDU, a video recorder for recording the video signal generated by the camera having an output, and a selector switch for switching the output of the camera to either the first input of the VDU or the video recorder, said VDU having a second input connected to the output of said video recorder and providing a second trace corresponding to the recorder output.

4. Apparatus according to claim 3 wherein the light generating means comprises a laser source.

5. Apparatus according to claim 4 wherein the VDU is a split screen type.

6. Apparatus according to claim 4 wherein the VDU is a split beam type.

7. Apparatus according to any one of claims 3-6 further comprising mechanical tracking means mounted on the VDU whereby the trace or traces on the screen of the VDU may be manually tracked so as to provide corresponding linear displacements in two Cartesian axes, and electro-mechanical means for converting said displacements into respective digital displays.

8. Apparatus according to claim 7 wherein said electromechanical conversion means includes means providing angular compensation of the displacement inputs to allow for non-orthogonical positioning of the camera with respect to the scanned profile whereby the digital displays indicate displacements in a vertical plane.

9. Apparatus according to any one of claims 3-6 wherein said profiling table comprises a bench having longitudinal slideways, a machine table on which the object is mounted which is slidable along said slideways and a counter for indicating displacements of the machine table, said counter being positioned in the field of view of the camera.

10. An apparatus according to claim 3 wherein the VDU is a split screen type.

11. An apparatus according to claim 3 wherein the VDU is a split beam type.

12. Apparatus according to any one of claims 3-6, 10 or 11 wherein reflectors are mounted on the profiling table so as to reflect part or parts of the beam onto the sides of the object.

13. Apparatus according to claim 12 wherein reflectors are mounted on the profiling table so as to include in the camera's field of view reflections of the sides of the object illuminated by the reflected beam.

14. An apparatus according to claim 12 further comprising mechanical tracking means mounted on the VDU whereby the trace or traces on the screen of the VDU may be manually tracked so as to provide corresponding linear displacements in two Cartesian axes, and electro-mechanical means for converting said displacements into respective digital displays.

15. An apparatus according to claim 13 further comprising mechanical tracking means mounted on the VDU whereby the trace or traces on the screen of the VDU may be manually tracked so as to provide corresponding linear displacements in two Cartesian axes, and electro-mechanical means for converting said displacements into respective digital displays.

16. An apparatus according to claim 12 wherein said profiling table comprises a bench having longitudinal slideways, a machine table on which the object is mounted which is slidable along said slideways and a counter for indicating displacements of the machine table, said counter being positioned in the field of view of the camera.

17. An apparatus according to claim 13 wherein said profiling table comprises a bench having longitudinal slideways, a machine table on which the object is mounted which is slidable along said slideways and a counter for indicating displacements of the machine table, said counter being positioned in the field of view of the camera.

18. An apparatus according to claim 7 wherein said profiling table comprises a bench having longitudinal slideways, a machine table on which the object is mounted which is slidable along said slideways and a counter for indicating displacements of the machine table, said counter being positioned in the field of view of the camera.

* * * * *